(12) United States Patent
Kroll et al.

(10) Patent No.: US 7,559,089 B2
(45) Date of Patent: *Jul. 7, 2009

(54) PERSONAL MEDIA PLAYER APPARATUS AND METHOD

(75) Inventors: Mitchell H. Kroll, Solon, OH (US); Lauren B. Spilman, Moreland Hills, OH (US); Steven J. Spilman, Moreland Hills, OH (US); Blake R. Squires, Fairlawn, OH (US); Christopher A. Celeste, Shaker Heights, OH (US)

(73) Assignee: Findaway World, Inc., Chagrin Falls, OH (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/220,848

(22) Filed: Sep. 8, 2005

(65) Prior Publication Data

US 2006/0020890 A1    Jan. 26, 2006

(51) Int. Cl.
*G06F 17/30* (2006.01)
*G06F 12/14* (2006.01)

(52) U.S. Cl. .................... 726/26; 713/194
(58) Field of Classification Search .......... None
See application file for complete search history.

(56) References Cited

U.S. PATENT DOCUMENTS

| | | | |
|---|---|---|---|
| 5,737,433 A * | 4/1998 | Gardner | 381/94.7 |
| 5,929,848 A | 7/1999 | Albukerk et al. | |
| 6,142,869 A | 11/2000 | Meyer et al. | |
| 2002/0077988 A1 * | 6/2002 | Sasaki et al. | 705/59 |
| 2002/0112250 A1 | 8/2002 | Koplar et al. | |
| 2002/0141582 A1 | 10/2002 | Kocher et al. | |
| 2003/0016940 A1 | 1/2003 | Robbins | |
| 2003/0104824 A1 | 6/2003 | Hale et al. | |
| 2004/0059927 A1 * | 3/2004 | Chen | 713/189 |
| 2006/0020890 A1 | 1/2006 | Kroll et al. | |
| 2008/0065246 A1 * | 3/2008 | Zorkendorfer et al. | 700/94 |

FOREIGN PATENT DOCUMENTS

| | | |
|---|---|---|
| EP | 0697670 A1 | 2/1996 |
| JP | 2003241698 | 8/2003 |
| WO | WO 2004/114303 A1 | 12/2004 |
| WO | WO 2006/051629 A1 | 5/2006 |

OTHER PUBLICATIONS

"Guard Dogs"; Nov. 7, 2002; http://ww.miracles4fun.com/guard-dogs.htm; 2 pages.
Supplementary European Search Report mailed Mar. 19, 2008; 4 pages.
http://www.sdcard.org/news/2006_12_04_sdcard.pdf; whole document; Dec. 4, 2006.
http://www.sdcard.org/news/2006_01_04_sdcard.pdf; whole document; Jan. 4, 2006.
International Search Report dated May 30, 2008; 5 pages.

* cited by examiner

*Primary Examiner*—Brandon S Hoffman
(74) *Attorney, Agent, or Firm*—Baker & Hostetler LLP

(57) ABSTRACT

A compact portable, self contained digital media player is provided whose content is not recordable or removable by a user. The content is playable in a high fidelity format. The binding of the content to the media player results in a significant degree of copyright protection. The compactness of the player enables binding of the player with various products. The self-contained aspect of the player enables it to be instant playable.

29 Claims, 12 Drawing Sheets

PERSONAL MEDIA PLAYER APPARATUS AND METHOD

CROSS REFERENCE TO RELATED APPLICATIONS

This application claims priority to non-provisional U.S. patent application entitled "METHOD FOR COMMERCIALIZATION AND ADVERTISING USING A PERSONAL MEDIA PLAYER," filed Oct. 29, 2004, having Ser. No. 10/975,534, which claims priority to provisional U.S. patent application entitled "PERSONAL MEDIA PLAYER AND METHOD FOR USE THEREOF," filed Jul. 23, 2004, having a Ser. No. 60/590,364, the disclosures of which are hereby incorporated by reference in their entirety.

FIELD OF THE INVENTION

The present invention relates generally to a portable personal media player. More particularly, the present invention relates to a personal digital media player having a fixed, pre-loaded content for playing entertainment, advertising, providing information, education, etc. for a user.

BACKGROUND OF THE INVENTION

Conventional approaches to audio and visual media are primarily focused on providing entertainment to the consumer. To facilitate this objective, entertainment-related industries have developed a diverse inventory of electronic devices that provide a mechanism for a consumer to enjoy recorded entertainment or information. Examples of such devices include conventional DVD players, CD players, DAT players, mini-Disc players, TiVo, and the like. However, all of these devices are presumed to be a consumer-purchased item, separate from the content placed therein, the devices all having recordable content capabilities. All of these personal players are also designed for easy transfer of digital content, by the consumer, to the players.

With the advent of digitally coded content and the ease of communicating digital information, copyright protection of the loaded content has become an ever increasing concern in the entertainment industry. There exists no satisfactory mechanism for preventing the unauthorized copying of digital entertainment or information stored onto the player.

It is also recognized that entertainment has within it secondary or consumer influence attributes such as advertising, cross marketing, or branding, when used in addition to the entertainment. The full potential of such secondary value has not been fully exploited because the played entertainment or content is often experienced in a surrounding that is disassociated from the seller of the player, who may be a sponsor of the entertainment or content. Thus, secondary value, such as tying the content in the player to the seller's venue cannot be exploited.

Therefore, there has been a longstanding need for systems and methods that safeguard copyright protection and also enable correlation of the content with the seller's venue or objective.

BRIEF SUMMARY OF THE INVENTION

In accordance with one example aspect, the present invention is directed to a personal media player that generally includes a user-inaccessible memory having preloaded digital content stored therein, wherein the digital content is inalterable by a user; a microprocessor coupled to the memory; a user interface, coupled to the microprocessor, adapted for receiving user input indicative of a desired manipulation of the digital content; and a display adapted for displaying graphic information indicative of a preselected aspect of the digital content.

In accordance with another example aspect, the present invention is directed to a personal media player generally including a user-inaccessible memory having preloaded digital content stored therein, wherein the digital content is inalterable by a user; a microprocessor coupled to the memory; a user interface, coupled to the microprocessor, adapted for receiving user input indicative of a desired manipulation of the digital content; and a bookmarking means, responsive to user input, adapted for associating a selected portion of the digital content with a bookmark. The example player preferably also includes a display adapted for displaying graphic information indicative of a preselected aspect of the digital content.

In accordance with yet another example aspect, the present invention is directed to a personal media player. The media player preferably includes a user-inaccessible memory having preloaded digital content stored therein, wherein the digital content is inalterable by a user; a microprocessor coupled to the memory; a user interface, coupled to the microprocessor, adapted for receiving user input indicative of a desired manipulation of the digital content; and a playback speed control means, responsive to user input, adapted for actuating playback of the digital content at a speed that differs than normal playback speed. The player preferably also includes a display adapted for displaying graphic information indicative of a preselected aspect of the digital content.

BRIEF DESCRIPTION OF THE DRAWINGS

These and other features and a more thorough understanding of the present invention may be achieved by referring to the following description and claims, taken in conjunction with the accompanying drawings, wherein:

FIG. 8b is a bottom perspective view of the exemplary buttons of FIG. 8a;

FIG. 9b is a bottom perspective view of the exemplary retractable clip of FIG. 9a;

DETAILED DISCUSSION OF EXAMPLE EMBODIMENTS

Figure 1:
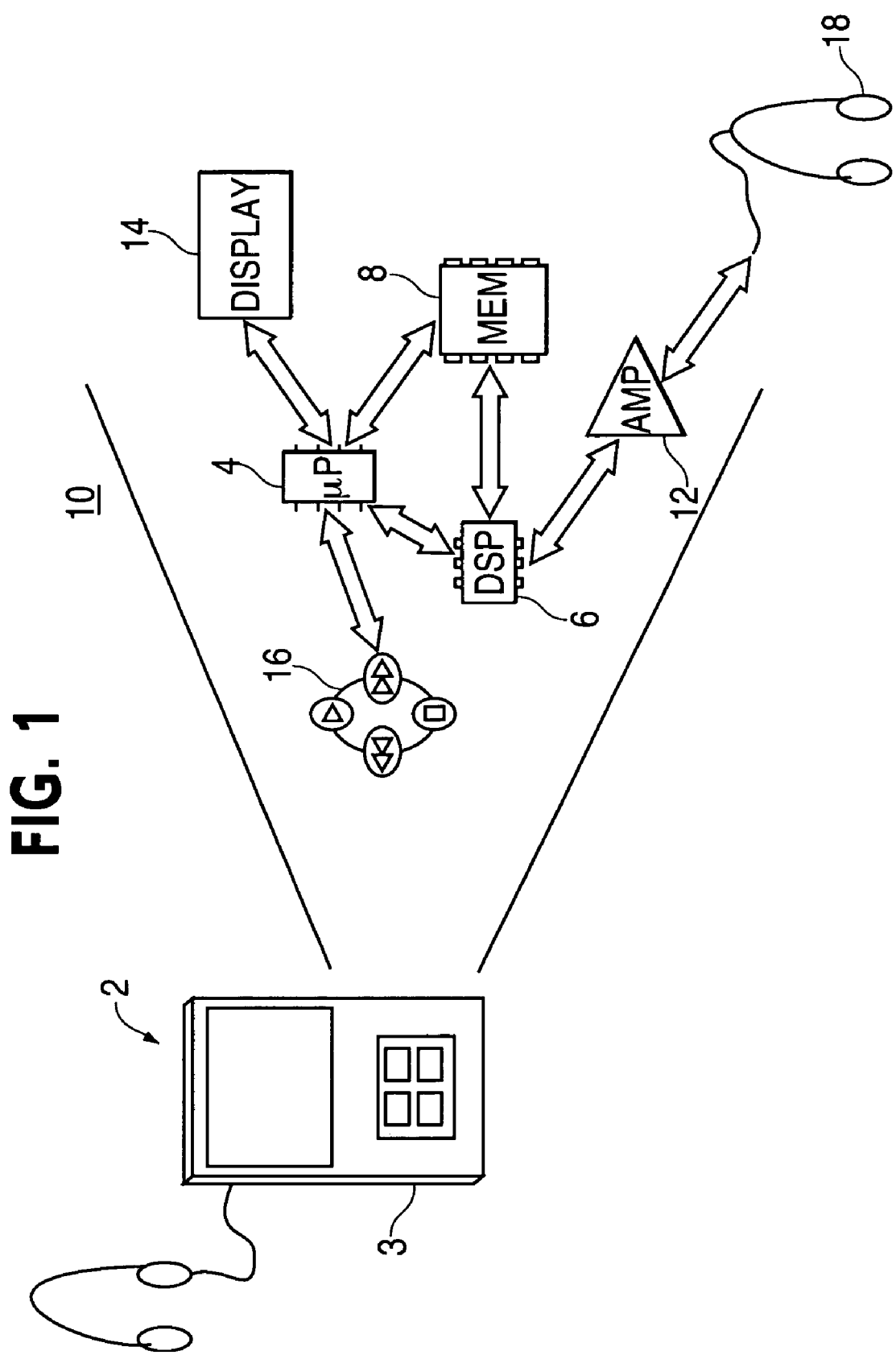
FIG. 1 is a functional illustration of an exemplary embodiment of the personal media player of present invention.

The invention will now be described with reference to the drawing figures, in which like reference numerals refer to like parts throughout. Various embodiments in accordance with the present invention provide systems and methods for a media player having a fixed, non-consumer recordable content. The binding of the content to the player reduces unauthorized copying of the content and also enables the appearance of the player to be tailored to the content, aspects of both of which will be more fully described hereinafter.

A functional illustration 10 of an exemplary player 2 is provided in FIG. 1. The exemplary player 2 is illustrated in FIG. 1 as a personal, portable media player 2 having digitally encapsulated fixed content therein, which content is preferably non-consumer modifiable and/or transferable. The player 2 is generally configured with a microprocessor (μP) 4 and/or digital signal processor (DSP) 6 for processing and converting the digital content contained in memory 8 for amplification by an amplifier/digital-to-analog converter (DAC) 12.

The microprocessor 4 is coupled, directly or indirectly, to an optional display 14, which displays information relating to the content and/or the status of the player 2. For example, the display 14 may be a liquid crystal display (LCD) or an organic light emitting diode (OLED), or the like, which monitors the battery status, play status, chapter, song title/artist/time, etc. The display 14 can also, in various exemplary embodiments, operate as a screen for video playback or photo illustration and is preferably designed to consume nominal power to conserve energy, accomplished by conventional approaches known to one of ordinary skill in the art. Power conservation schemes for the microprocessor 4 and DSP 6 may also be used, as according to design preference. Various additional aspects of the display 14 will be discussed hereinafter.

The microprocessor 4 preferably also operates to respond to user input in a control interface 16. The control interface 16 contains standard control functions, such as, for example, volume, play, stop, fast forward/skip, reverse, etc. Other control functions, such as, for example, mode select, pause, random play, equalizer, bass/treble, etc., may be implemented according to design preferences. Various additional aspects of the control interface 16 will be discussed hereinafter.

Based on the type of microprocessor 4 utilized, the DSP 6 may not be necessary for various exemplary embodiments. It is well known that some microprocessors are capable of performing DSP functions. Accordingly, depending on the sophistication of the microprocessor chosen and the type of decompression/conversion being performed on the stored content, the DSP 6 may not be a necessary element for performing the desired function. Therefore, the microprocessor 4, if optionally present, may be directly coupled to the amplifier/DAC 12, for amplifying the content extracted from the memory 8.

It should be appreciated that while FIG. 1 illustrates the memory 8 as having a "chip" like appearance, any type of memory capable of storing digital content may be used. For example, any memory, whether in a single or distributed configuration or, as commonly used, such as ROM, flash, DTP, etc., may be used for storing the content. It should also be appreciated that the memory 8 may be integrated into the microprocessor 4 or DSP 6. It is well known that microprocessors or DSPs are capable of being designed with built-in memory, whether in cache and/or static form. Accordingly, based on the availability and size of built-in memory, the stand alone memory 8, as a separate component, may not be necessary.

The digital content stored in the memory 8 may be in compressed form, according to any one or more of now known or future compression schemes, such as, for example, MP3, WAV, RA, SML, OGG, AC, Atrac and WMx, and the like. Video content can be accommodated, therefore, compression such as MPEG, JPEG, DV, WMX, and DiVx, etc. can be used. Compression, whether lossy or non-lossy, may be desired to increase the amount of content storable in the memory 8. Based on the compression scheme utilized, and the type of fidelity desired, the content stored may encompass any type of storable content, ranging from a series of songs, an audible book, a movie, and the like. The content, if compressed, is suitably decompressed or converted by the microprocessor 4 and/or the DSP 6, which is amplified and converted by the amplifier/DAC 12. The amplified content stream is conveyed to headphones 18 for aural presentation and to optional display 14 for visual presentation to the user.

Portions of or the entire control interface 16 may be attached to the headphones 18 to conveniently enable a user to control the player 2, or the headphones 18 may be of a wired variety or non-wired, comprising one or more speaker elements. Additionally, the headphones 18 may be integrally attached to the player 2, so as to prevent removal from the player 2, or, as seen in conventional player systems, removably attachable thereto.

In the various exemplary embodiments having removable headphones 18, a corresponding headphone jack 7 (illustrated in FIG. 3) is preferably, but not necessarily, a standard headphone stereo jack, so as to enable compatibility with standard headphone jack mating equipment. Accordingly, the player's headphone jack 7 may be connected to a home stereo or similar system to enable the user to enjoy the content using speakers or amplifiers other than that directly provided by the player. The headphone jack 7 may additionally facilitate the use of an FM tuner/broadcaster or other broadcast or playback mechanism, as is commonly seen in other portable electronic devices.

Figure 10:
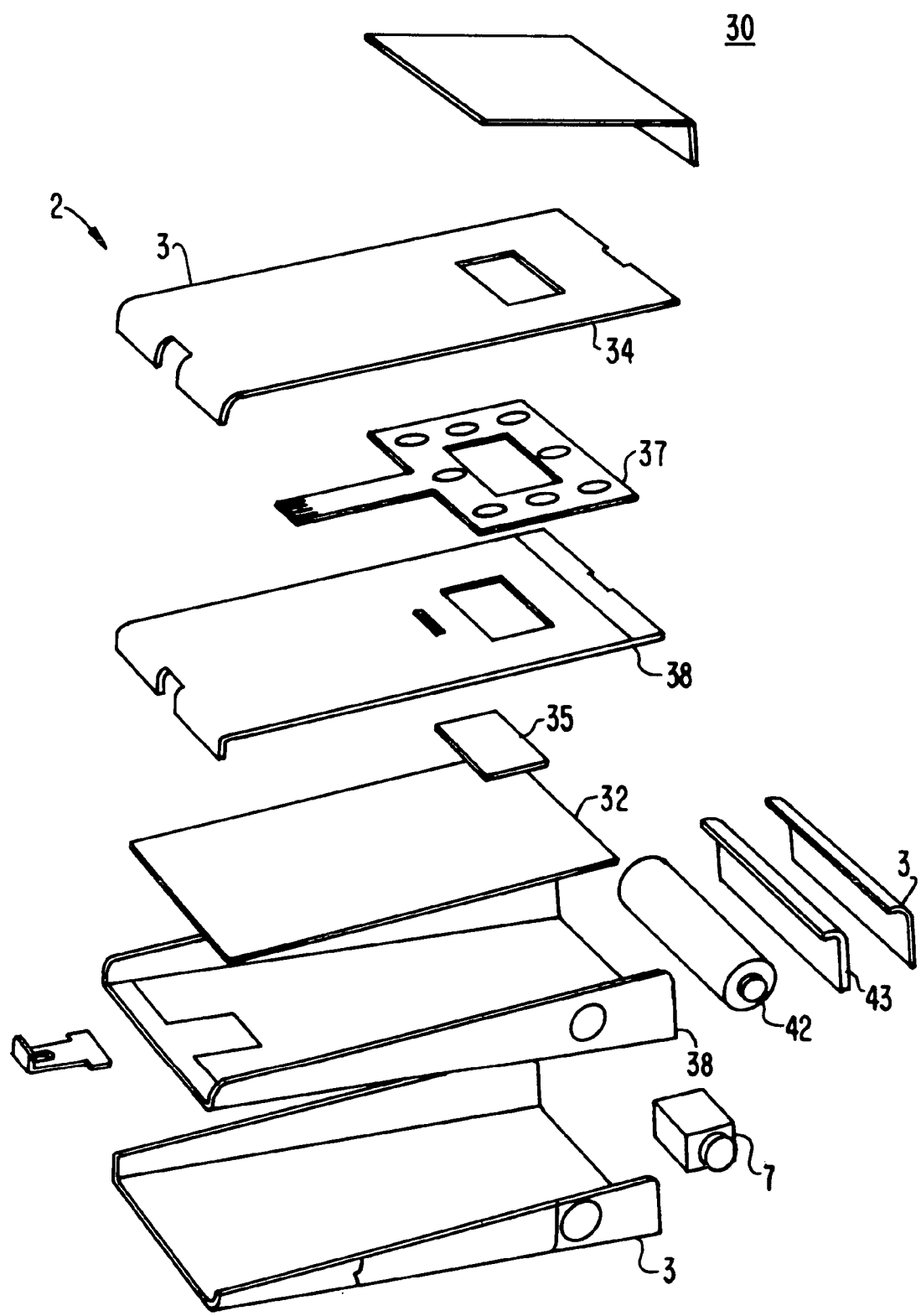
FIG. 10 is a perspective and partially exploded view of an alternate example personal media player according to the present invention.

An enclosure or "skin" 3 is illustrated in FIG. 10 as encompassing the player 2. The skin 3, in addition to providing an enclosure for the player 2, may be configured with a design for visual branding of elements tied to the content in the memory 8 or to a third-party. Thus, for example, the player 2 may suitably be preloaded with digital content corresponding to an audio book (i.e., an audible recording of a narration of a book). Further thereto, the skin 3 may be configured with a design that generally corresponds to and optionally incorporates visual elements from a dust jacket or similar tangible item typically associated with a physical copy of the book. Additionally, the configuration of the skin 3 may comprise a design and/or a shaping of the form of the enclosure. For example, the skin 3 may be shaped in the form of Mickey Mouse ears to convey a Disney-related content in the player 2. The skin 3 or exterior of the player 2 can also be altered to enable easier "wearability" of the player 2. For example, a ring or hole in the skin of the player 2 can be accommodated to facilitate a lanyard, a clip, etc., to enable attachment to a user's person.

With continued reference to the wearability of the player 2, the player 2 may optionally include a retractable clip 5 adapted for being associated with a lanyard, clip, and the like. As exemplary shown in FIGS. 3, 6, 9a, 9b and 10, the retractable clip 5 is preferably provided as a generally planar member, optionally having a terminal flange-like member 9 (FIG.

9b) for enabling manipulation of the same, and having a hole or similar aperture (which aperture may suitably be completed by the body of the player 2) therein, which aperture permits association of the player 2 with a cord, cable or similar lanyard-like article. Further, the retractable clip 5 is preferably provided as a retractable member, i.e., the clip 5 may suitably be extended from the player 2 when it is desired to be associated with a lanyard or similar feature, and may suitably be retracted into the player 2 when not needed. The retractable clip 5, if optionally present, is preferably disposed along an end of the player 2, thereby enabling the player 2 to be disposed about an individual's neck and lay against a chest of the same, in a manner generally akin to a press pass or similar worn article.

In various exemplary embodiments, the content encapsulated in memory 8 is understood to be non-re-recordable by the user/consumer. As stated above, the content may be of any form of digital audio, video, audio/video, multimedia, textual, graphical, etc., or any combination thereof. The content is pre-loaded into the memory 8 prior to the user's receipt and, thus cannot be manipulated, overwritten, re-recorded by the user. The memory 8, may be separately loaded from the player 2, having content pre-loaded therein and, thereafter, inserted into the player 2, either during the player's 2 assembly or prior to distribution to a user.

It should be appreciated that, upon processing the digital information or content from the memory 8, a step of performing a conversion from a digital format to an analog format is accomplished by the use of digital-to-analog converters DAC (shown in FIG. 1 as a combined amplifier/DAC 12). The DAC may be a separate component from the amplifier and thus implemented between the microprocessor 4/DSP 6 and the amplifier 12. Alternatively, the DAC may be situated between the amplifier 12 and the headphones 18 and/or the display 14.

It should be appreciated that in the exemplary embodiments having a "pre-loaded" content in the memory 8, the memory 8 is prevented from being subsequently removed from the player 2 by the user. The ability to secure the memory 8 and thus the content in the player 2 can be accomplished by using a 1-way mechanical latch in the player 2. Alternatively, an electrical fuse or a coating/lock-out scheme can be implemented in the memory 8, preventing unauthorized removal of the memory 8 from the player 2. Similarly, access to the microprocessor 4 for loading content into the memory 8 by a user, may restricted by an access code in the microprocessor 4, through a proprietary loading apparatus and the like.

Based on the exemplary player 2, a user, upon purchase or acquisition of the exemplary player 2, can immediately enjoy or access the content in the player 2. Thus, the exemplary player 2 provides a "un-wrap and play" functionality. Moreover, since the content in the player 2 is fixed, non-transferable, and non-rerecordable, content providers and sponsors of the content and/or player and/or skin advertisements do not need to fear wholesale copying of the content, as the content is only playable via the analog output to the headphones 18 or a coupled device through the headphone jack.

Figure 2:
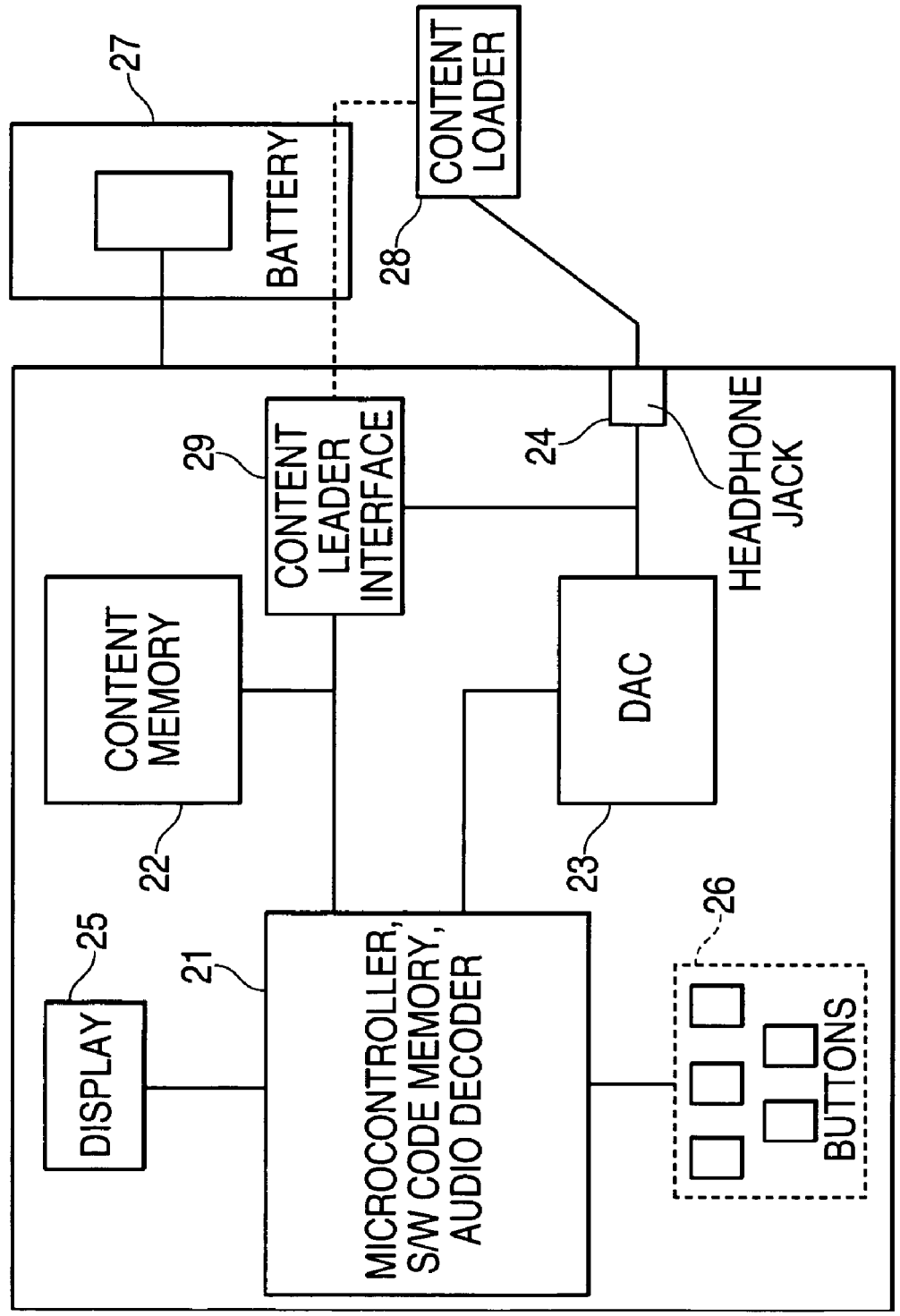
FIG. 2 is a block diagram of another exemplary embodiment of the personal media player of the present invention.

FIG. 2 is an illustration 20 of a functional layout of various elements of another exemplary embodiment of the present invention. The exemplary embodiment of FIG. 2 shares many of the same components that were described in connection with the embodiment of FIG. 1. For example, a microcontroller 21 receives digitalized content from the memory 22. The content is decompressed or processed by the microcontroller 21 and forwarded to the DAC 23. From the DAC 23, the content (now in analog form) is conveyed to the headphone jack 24. The microcontroller 21 also receives inputs from the control 26 and outputs information to the display 25. Given the capabilities of the display 25 chosen and the type of content stored in the memory 22, the content as well as status information may be passed on to the display 25, for viewing by the user.

The illustration of FIG. 2 includes a content loading capability. That is, a content loader interface 29 is provided in the exemplary embodiment to enable an exterior content loader 28, to load content into the memory 22. The content loader 28 is illustrated as coupling to the memory 22 via the headphone jack 24. In this configuration, the content loading is facilitated by a male-like prong that protrudes into the headphone jack 24 and mates with the content loader interface 29, to enable electrical communication with the content memory 22 and, if necessary, the microcontroller 21. Accordingly, in embodiments utilizing a headphone jack-through connection, the content loader interface 29 will be "behind" the headphone jack 24 to enable contact with the external content loader connector. Via this external-to-internal connection, content designated for downloading from the content loader 28 can be communicated into the memory 22, without disassembling the player or requiring the content to be pre-loaded into the memory 22 prior to assembly of the player.

An alternative scheme for externally loading content is also illustrated in FIG. 2 by the dashed line connecting the content loader 28 to the content loader interface 29. In this alternative scheme, an access port is accommodated within the battery housing or battery chamber 27. Via this access port (not shown), the content loader 28 can similarly load content into the memory 22. In this embodiment, it is contemplated that the content loader interface 29 will be exposed or considered accessible when the battery is removed from the battery housing 27. Of course, other access ports or locations may be used according to design preferences.

In an exemplary embodiment of FIG. 2, the connection between the content loader 28 and the content loader interface 29 is a serial interface, which is preferably, but not necessarily, a universal serial bus (USB) interface. Of course, other bus, or communication/transfer methodologies or architectures may be utilized according to design preference, such as, for example, Firewire, USB 2, etc. To prevent user access to memory 22, the content loader interface may be configured with a code key or other mechanism to restrict unauthorized access. Alternatively, a specific sequence of button 21 presses can be used to enable the memory 22 to be loaded. As another alternative, separate hidden buttons are switches could be used to enable programming of the memory 22. The buttons or switches would be accessible by one or more holes located in the casing, which would be covered by the content sheet.

Figure 4:
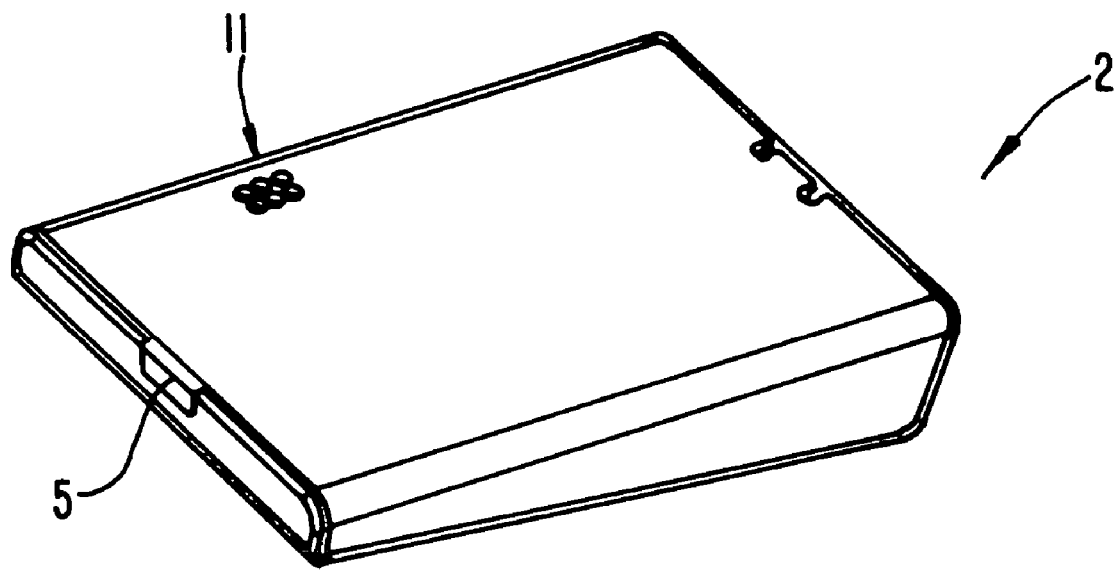
FIG. 4 is a generally bottom perspective view of the personal media player of FIG. 3.

Despite the foregoing discussion of various content loading approaches, it is to be appreciated that any suitable system may be employed for loading content onto the player 2. In one embodiment, FIG. 4 illustrates an alternate approach for content loading. Specifically, the player 2 may suitably include one or more access points 11, disposed on a bottom surface of the player 2, through which a content loading apparatus interfaces with appropriate components of the player 2. The access points 11 may suitably be provided as generally aperture-like members that permit interfacing tip-like pins or similar feature of the content loader to penetrate the player 2 and interface with suitable components of the player 2 for loading content thereon. As will be made clear hereinafter, the positioning of the access points 11 on the bottom surface of the player 2 suitably enables hiding of the access points 11 after a skin is disposed on the player 2 bottom surface.

Figure 3:
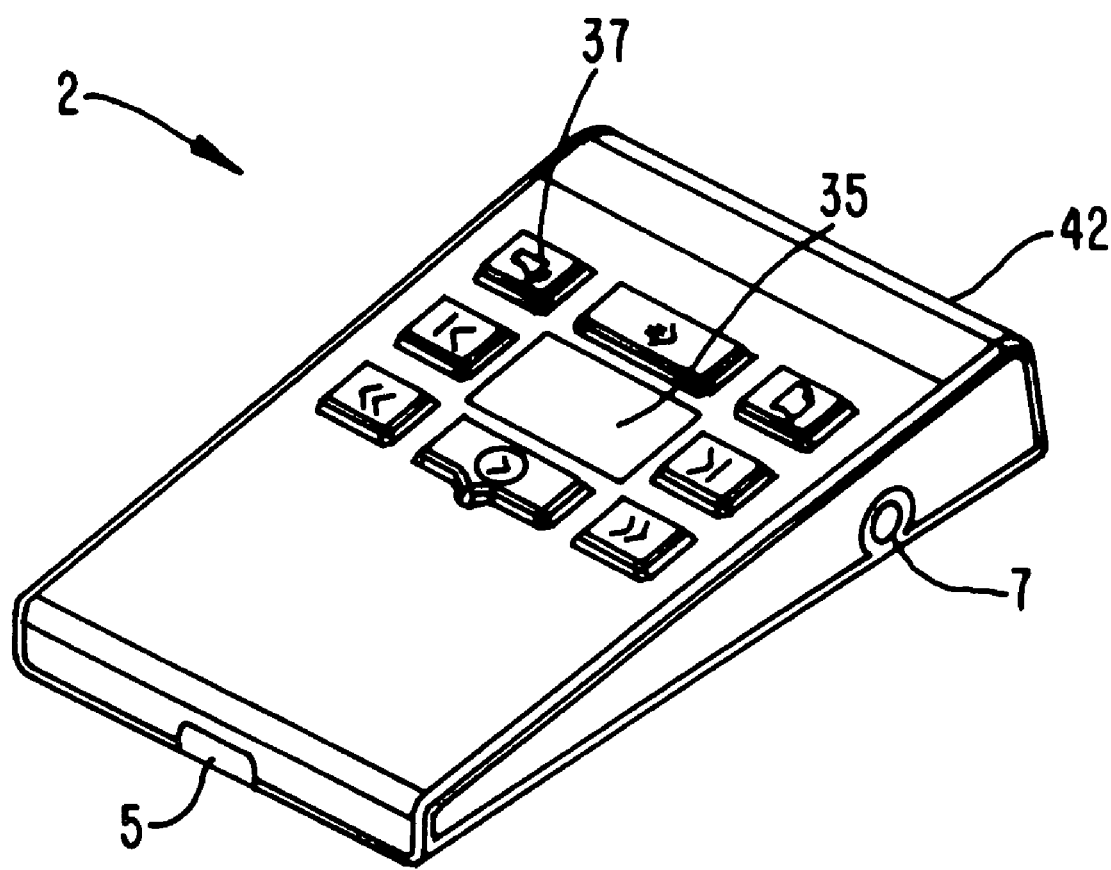
FIG. 3 is a generally top perspective view of an exemplary personal media player according to the present invention.
Figure 6:
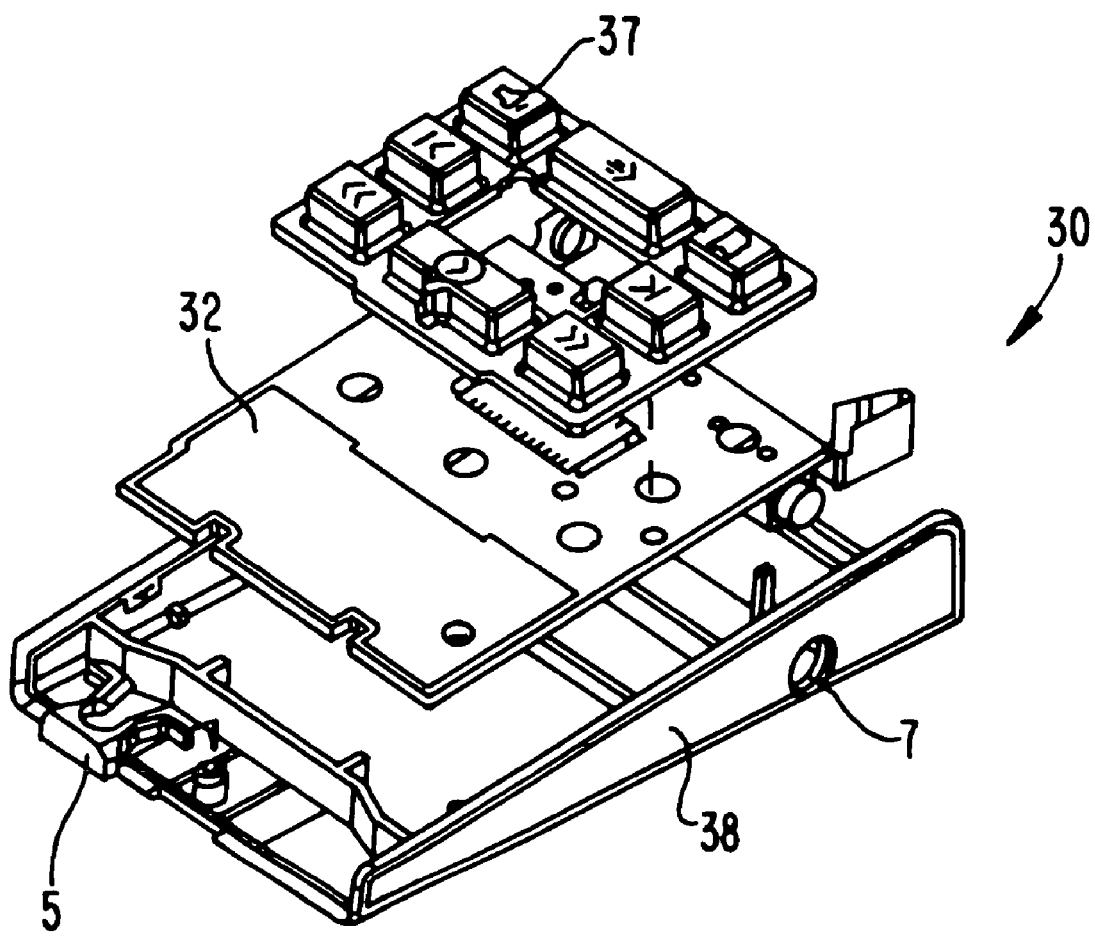
FIG. 6 is a top perspective and partially exploded view of the personal media player of the preceding Figures, wherein a cover thereof is removed.
Figure 7:
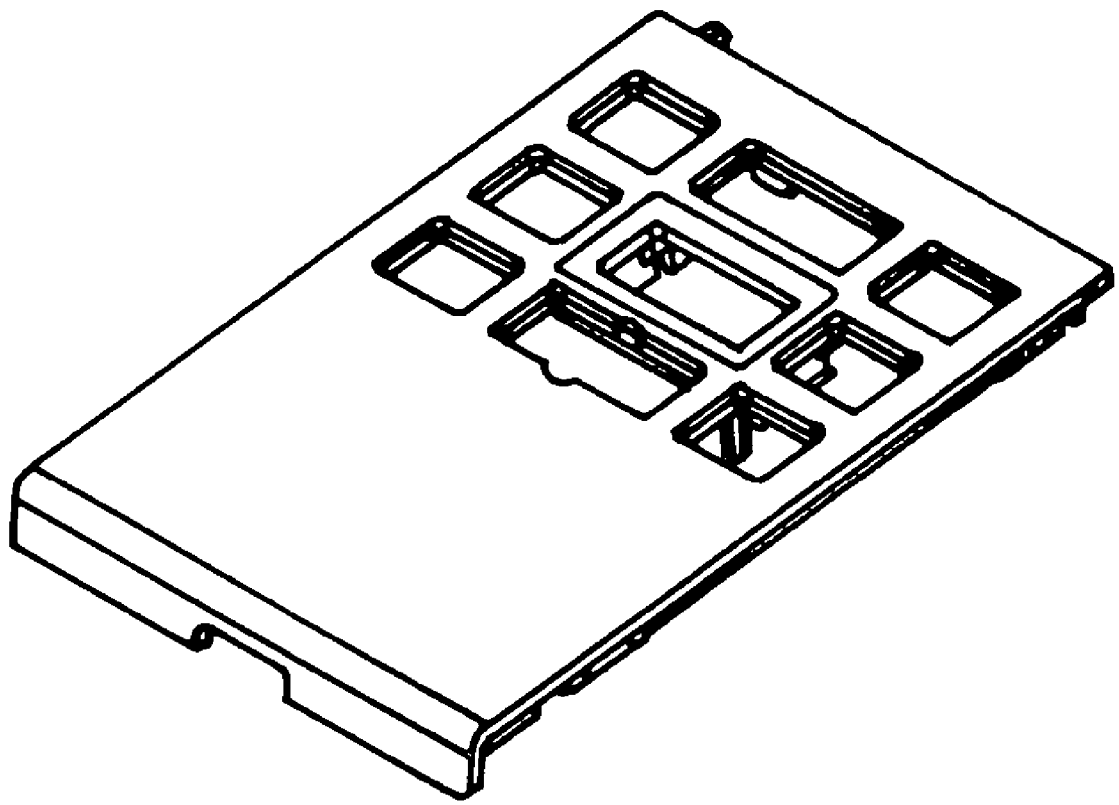
FIG. 7 is a top perspective view of an exemplary cover of the personal media player of the present invention.

FIG. 6 presents an illustration of an exploded view 30 of the components of an exemplary embodiment of the player 2. The exploded view 30 illustrates a printed circuit board (PCB) 32 containing electronics (such as described in FIGS. 1 and 2) for performing the functions of the media player. User controls 37, for controlling the playback and/or interaction with the player, are coupled to the PCB 32. An ear bud jack or external output jack 7 in the casing frame 38 is provided for audio and/or video output. The casing frame 38 provides a supporting structure for the PCB 32 and facilitates containment of a rechargeable or single use battery (preferably, but not necessarily, a AAA battery) which is fixed by a locking or securing cover 43 (FIG. 3). An exterior "branding" of the exemplary player is facilitated by an attachable skin 3 that is affixable to the casing through standard means, such as pressure-sensitive adhesive and the like.

Figure 5:
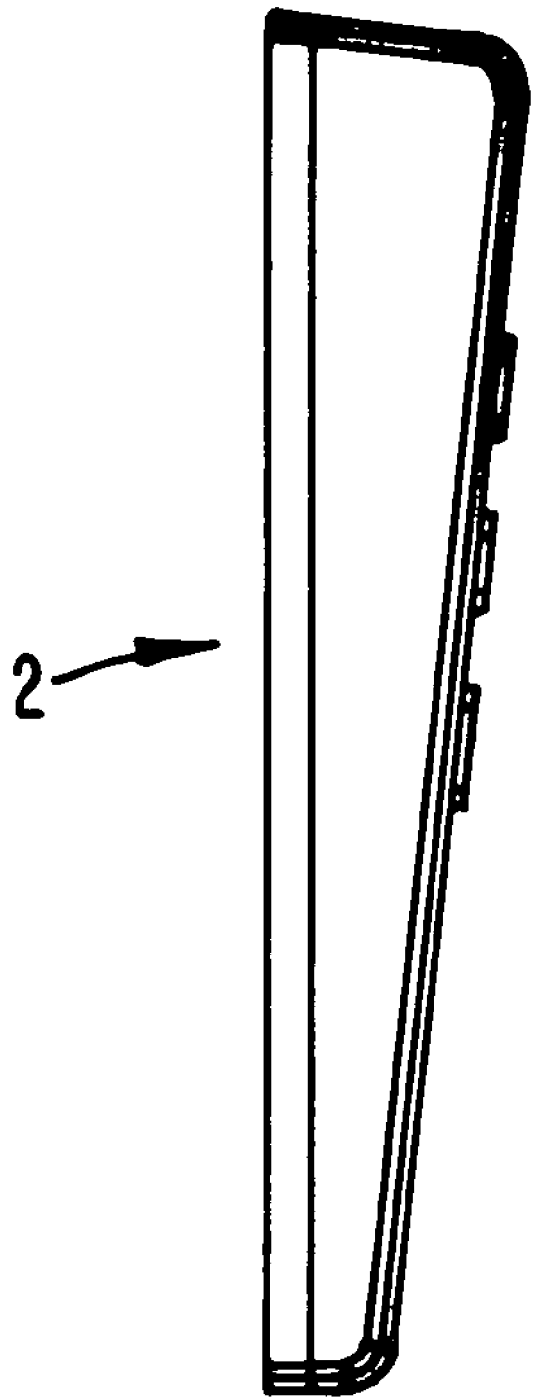
FIG. 5 is a side plan view of the personal media player of FIGS. 3 and 4.

In various exemplary embodiments, the casing frame 38 is desired to be of a compact size to enable users to hand carry the player. The casing frame 38 can be significantly smaller than a hand carry size, such as the size of a deck of cards, a matchbox or smaller, depending on design and the target market preference. Also, the casing frame 38 may be shaped to conform to a particular product or purpose. In one embodiment, the casing frame 38 is configured in a general wedge-like shape, as best depicted in FIG. 5.

The exemplary player may be configurable with an optional display 35 for illustrating various information regarding the content provided in the exemplary player. The display 35 is preferably coupled to the PCB 32 and to the supporting circuitry therein. In an exemplary embodiment, the display 35 is an LCD or OLED having alpha-numeric characters corresponding to the track, chapter, etc. Backlighting of the display 35 may be used according to the design preferences. The display 35 is capable of going into a power conservation mode—e.g., turning off after a specified number of seconds, or by explicit manipulation of the user interface buttons 37. It is to be appreciated that types of displays 35 other than LCDs or OLEDs may be used accordingly to design preference.

The display 35 may suitably be configured to graphically illustrate and provide any desired and suitable information. In one embodiment, the display 35 may suitably be configured to provide information (e.g., a chapter number) identifying a portion of the preloaded content currently being played by the player 2. In another embodiment, the display 35 may suitably be configured to provide information identifying an amount of time remaining for a particular portion (e.g., a chapter) of preloaded content being played. In yet another embodiment, the display 35 may suitably be configured to provide a plurality of items of information. Further thereto, the display 35 may suitably concurrently provide at least two items of information, or may suitably provide one set of information for a predetermined period of time (e.g., five seconds) and then, upon expiration of the predetermined period of time, provide another set of information, also for a predetermined period of time. Thus, for example, the display 35 may be configured to display an identification of a currently being played chapter for five seconds and then display a time remaining for that chapter, also for five seconds, after which the display 35 suitably returns to displaying the chapter identification information. It is to be appreciated that any desirable information may be provided by the display 35, with various additional examples including, but not limited to, information indicative of a volume level, information related to various equalization aspects (e.g., treble, bass, levels of various frequencies, and the like), battery status information (e.g., a full battery indicium, a half full battery indicium, a nearly empty battery indicium, an empty battery indicium, and the like), playback speed information (as will be more fully described hereinafter), bookmark information (as will also be more fully described hereinafter), and the like.

It should be appreciated that while FIG. 3 illustrates the various components of an exemplary embodiment of the player 2 as being configured with a casing "top" mated to the casing body, alternative arrangements made be contemplated without departing from the spirit and scope of this invention. For example, the casing "top" may be a "bottom" and the casing structures may be a single piece rather than the multiple pieces described herein. Further, the optional display 35 may be placed at other suitable locations in the player.

Through the user interface, buttons 37 are illustrated in FIG. 6 as a set of push buttons that are situated on the PCB 32, it should be appreciated that alternative button types (e.g. switches, toggles, sensors) or configurations or locations may be used. For example, less or more buttons that are capacitive, resistive, or based on other common or future derived interface mechanisms can be implemented. Also, in an exemplary embodiment utilizing buttons, the functionalities of the buttons may be varied according to design preference. These variations of user interface buttons are well known in the art and, therefore, they are not further detailed herein. Additional aspects of the buttons 34 will be discussed hereinafter.

For exemplary embodiments capable of being loaded with content after assembly of the player, a bus interface for loading content into the memory is provided. The interface is situated interior to the casing and inaccessible through a port, such as the access points 11 (FIG. 4), located, for example, within the battery slot to enable a coupler to be inserted therein. The interface may also be situated interior to the headphone jack. The interface may be coded, electronically or mechanically, to prevent unauthorized loading of content into the player. Methods for defeating unauthorized use of the interface are well known to one of ordinary skill in the art and are, therefore, not detailed herein.

In an alternate and not illustrated embodiment, the player 2 may suitably not include a display 35. In this embodiment, since a display is not provided, the audio content in the player is suitably keyed with audible cues to the user. For example, when pressing a fast forward button, the microprocessor will generate a tone or sound indicating a fast forward operation. For example, an audible voice saying "fast forward" may be used to notify the user of the "mode" being invoked as being a fast forward operation. Such "tags" could be stored on memory resident in the microprocessor, or may be stored in the content memory.

Further, the content itself may be keyed with information indicating the tile of the song/piece/trade being played. Thus, "metatagging" to identify the song, artist, chapter, section, etc. could be encoded into the player as a separate asset or with the content. Methods for adding audible information to assist in tracking the operation of the player are well known and, therefore, not further detailed herein. Such methods may also be utilized in embodiments with a display.

The assembled player of FIG. 10 illustrates the exterior of the player as provided with an image or information relating to the content of the player. The images maybe affixed to the player by use of attachable content sheet as discussed hereinabove or the content sheet maybe obviated by directly imprinting on the player's casing the image or information provided by the "flap." Of course, other methods for placing an image or text on the exterior of the player may be used according to design preference.

Figure 11:
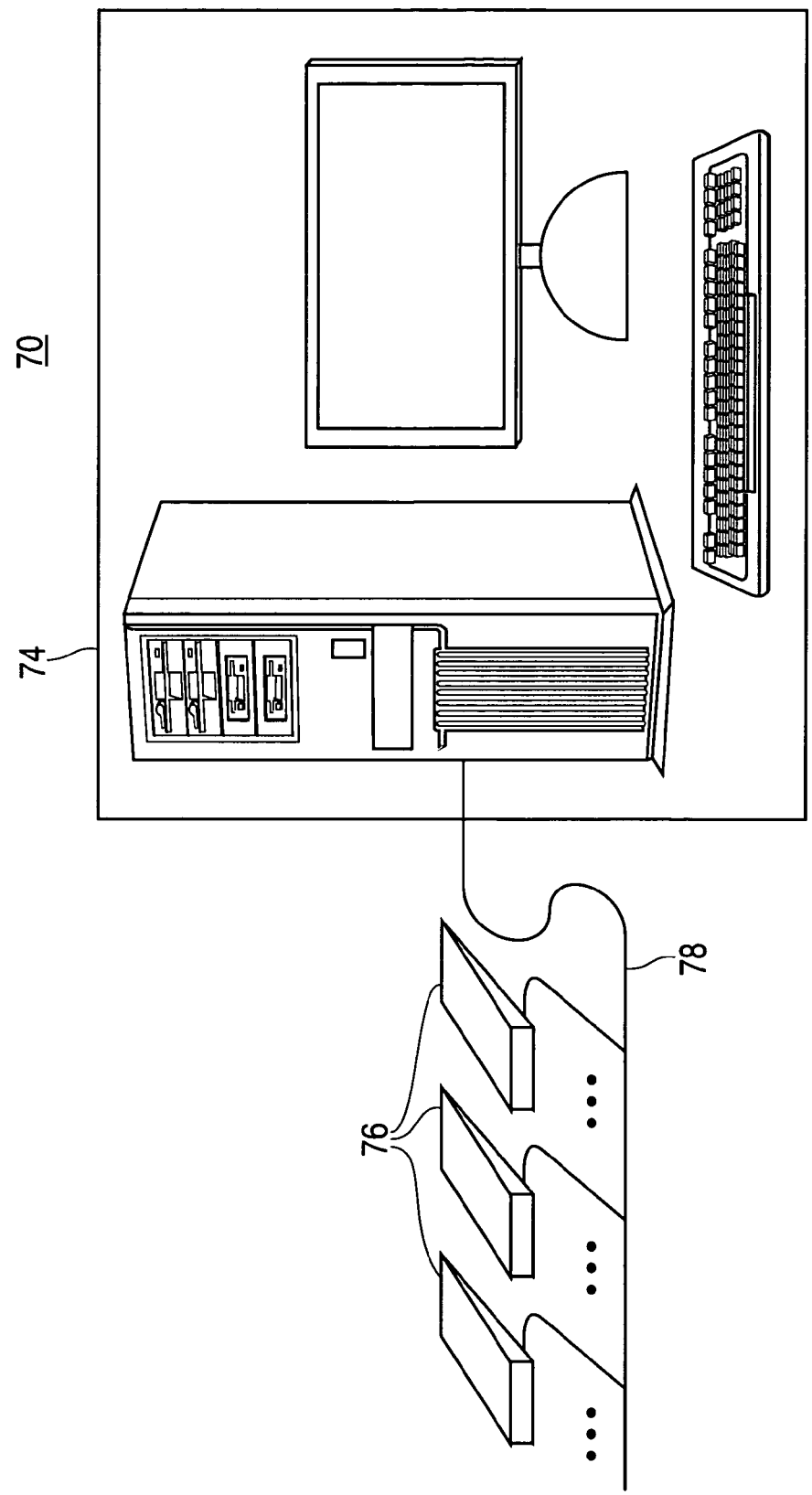
FIG. 11 is an illustration of an exemplary content loading system according to the present invention.

FIG. 11 is an illustration of a content loading system 70 for loading content in a post-assembled operation. Mass loading of content can be facilitated by the use of a communication bus 72 (parallel and/or serial) coupled to a content loader 74 and the "to-be-loaded" players 76. Connection to the players 76 can be accomplished by any of the methods described herein or by methods that are known in the art. The content loader 74 is illustrated in FIG. 11 as a personal computer system, however, it should be appreciated that any computing or data sharing device may be used without departing from the spirit and scope of this invention. It should also be appreciated that in a mass download operation, discrimination or selection of different content to different respective players 76 can be facilitated by a multiplexing the content over the bus and designating codes or protocols that enable different players to receive different content.

While FIG. 11 illustrates a plurality of players being loaded or programmed, a single player loading action can be performed as well. For example, a data processing device (e.g., PC, laptop, etc.) or similarly functioning device, pre-configured to operate as a content loader 74 may be used to load content into a single player 76 at a kiosk or a store. It should be appreciated that in a store or kiosk environment, the skin or content sheet may be custom made "on the spot" and affixed to the player to afford a degree of customizability to the player and for the customer.

Due to the ability of the player to be "pre-loaded" with non-removable content prior to use by the customer, and the compact size of the player, the player is well suited as an audio-book, as well as for educational or informational dissemination purposes, music playback, entertainment and the like. For example, the player can be configured with medical information relating to a disease that a patient is suffering from and be provided to a patient, for their private listening and education. Similarly, city tours, museum tours, group trainings and orientations can be privately experienced at the customer's and/or employee's leisure, without requiring VCR or DVD player or similar electronic devices that are bulky and also expensive to provide. Along these lines, the player is well suited for personal tutoring/coaching and can perform as an effective substitute for lengthy manuals and do-it-yourself programs. For products that are sold overseas, the players can be bundled with the product and configured with instructions or information in the native language. Due to the ability to be instantly playable, the player's content may be directed to advertising, to exploit the proximity of the customer's potential use of the player, within the venue of the seller of the player or a sponsor of the player. Thus, significant uses, heretheretoo, unknown in the industry can be developed and exploited by the use of a compact, portable, self-contained, fixed content player.

As previously mentioned, the player 2 of the present invention is particularly adapted for use as an audio book player. In an effort to provide a consumer with a more book-like experience, the player 2 contains certain features and configurations that accentuate the player's 2 book-like characteristics, while minimizing the electronic aspects of the same, but still providing a useful device. Further thereto, and as will be more fully described hereinafter, various aspects of the player 2 that accentuate its book-like characteristics include, by way of example, a user interface that has been modified so as to reduce its electronic profile and various other features that more closely approximate the book reading experience.

Returning to a discussion of the user interface, and, more specifically the buttons 37, the buttons 37 are preferably configured so as to be physically unobtrusive and more seamlessly integrated into the player 2. Reducing the size profile and obtrusiveness of the buttons 34 suitably reduces the electronic appearance of the player 2 by deemphasizing the user interface and emphasizing the content provided on the skin 3.

Turning to FIG. 10, illustrated is an example embodiment of buttons 34 that conform to the above mentioned aims and preferably incorporates membrane switch technology. As known to one of ordinary skill in the art, membrane switches provide the generally same functionality as conventional buttons, but are able to be disposed at a significantly reduced (relative to conventional buttons) vertical height. As shown in the FIG. 10, a membrane switch 37 is preferably disposed between the casing 38 and the skin 3 and is communicably associated with the various electronic components of the player 2. More specifically, the skin 3 preferably includes a plurality of graphic indicia thereon, each indicium of which generally corresponds to a button 34. The membrane switch 37 is preferably disposed beneath the portion of the skin 3 that features the graphic buttons 34 so that, as one of the buttons 34 on the skin 3 is depressed by a user, a portion of the membrane switch 37 corresponding to the depressed button suitably is actuated and transmits the appropriate functional directions to the electronic components of the player 2. Although a membrane switch has been described, it is to be appreciated that any suitable device may be employed for reducing the size profile of the buttons 34.

Figure 8A:
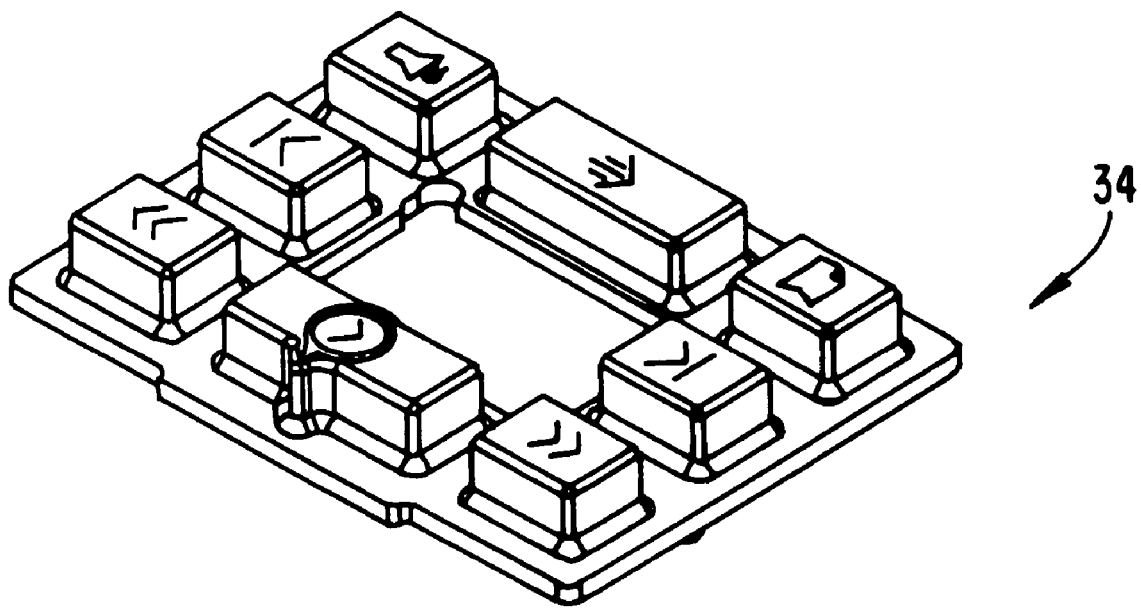
FIG. 8a is a top perspective view of exemplary buttons of the personal media player of the present invention.
Figure 8B:
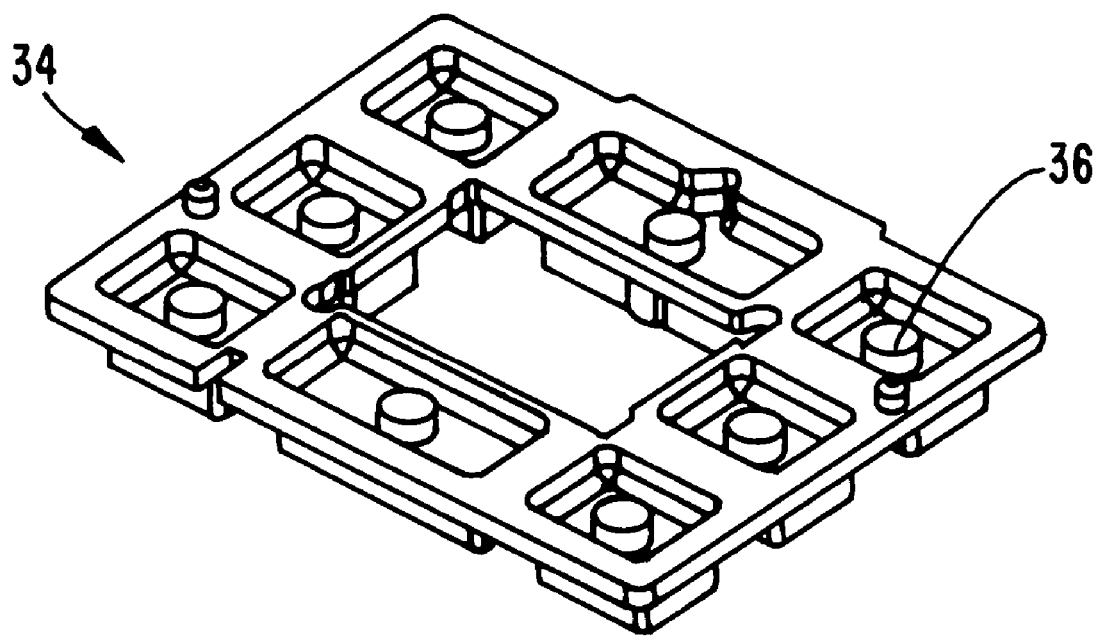
Figure 9A:
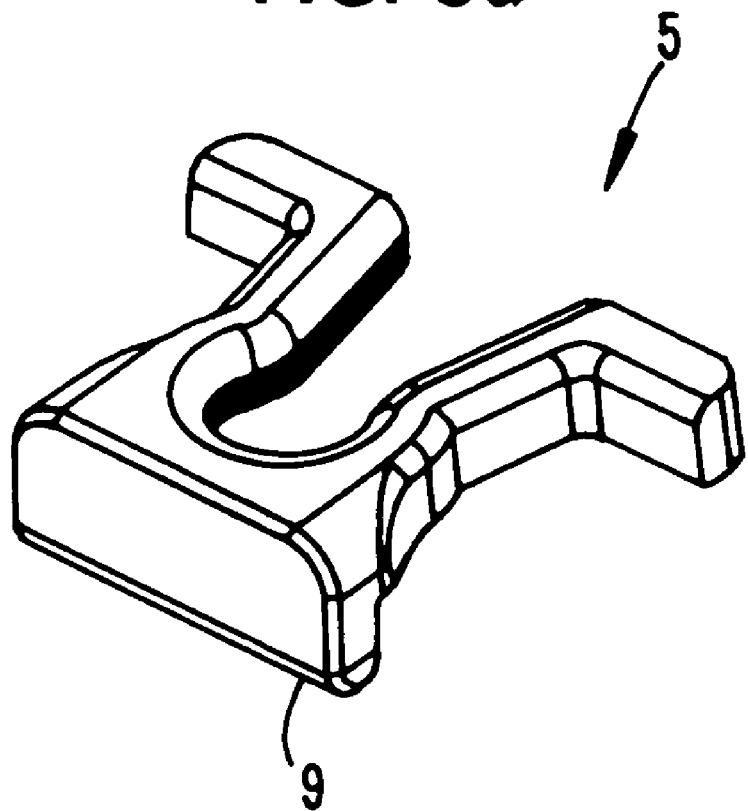
FIG. 9a is a top perspective of an exemplary retractable clip of the personal media player of the present invention.
Figure 9B:
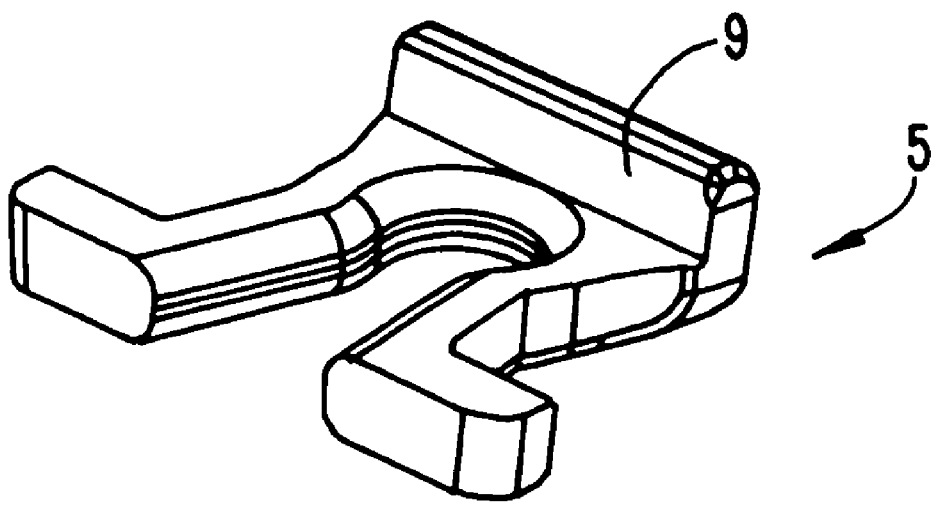

It is to be appreciated that any suitable button may be employed with the player 2 of the present invention. FIGS. 8a and 8b illustrate an alternate button embodiment by which a plurality of buttons 34 are provided as a generally unitary construction fabricated from an appropriately flexible rubber, polymer, elastomer, plastic or the like. Each button suitably includes on its bottom face a protruding nib 36 (FIG. 8b) that suitably interfaces with the PCB 32 and translates user-generated actuation of a button into actuation of the function corresponding to the actuated button.

With further reference to the buttons 34, the player 2 is preferably configured to feature any number of appropriate and suitable buttons 34. In a preferred embodiment, the player 2 is configured to include eight buttons, each of which is preferably associable with a discrete function that enables selective interfacing with the digital content. Additionally, the buttons 34, regardless of the number thereof present, are preferably disposed perimetrically about the display 14.

As previously mentioned, the player 2 of the present invention may suitably be loaded with a range of different types of digital content, such as music content, audio book content, educational content, and the like. As known to one of ordinary skill in the art, different content may suitably require a different set of interface buttons. For example, music content may require conventional button functions, such as, for example, power, play, pause, reverse, forward, chapter and/or track skip, equalizer and the like. Conversely, audio book content may require different button functionality, such as, for example, power, play, pause, reverse, forward, set and/or delete bookmark, volume speed control, and the like. The player 2 of the present invention is preferably adapted to accommodate the plurality of alternate functions that may be ascribed to the various buttons 34. Specifically and by way of preferred example, as digital content is loaded onto the player 2, preferably in accordance with the example methods described above, particular functions can be programmatically ascribed to each of the buttons in a content-dependant manner. Thus, for example, if the player 2 is loaded with digital content corresponding to an audio book, the buttons may suitably be ascribed functions appropriate for interfacing with audio book content (e.g., power, play, pause, bookmark, variable speed control, volume, and the like). By way of additional example, if the player 2 is loaded with digital content corresponding to general music or similar content, the buttons may suitably be ascribed functions appropriate for interfacing with music content (e.g., power, play, pause, fast forward/reverse, chapter and/or track skip, volume, equalizer, and the like).

As previously generally described, the skin 3 associable with the player 2 may suitably be customized to display any desired information and/or graphic indicia through printing, silk screening or similar method. The skin 3 may preferably be configured to include graphic illustrations of buttons that positionally overlie appropriate contact surfaces of the membrane switch 37, if such switch is optionally employed. As is evident, the skin 3 can be produced to include any desired graphic indicia thereon. Accordingly, if the player 2 is loaded with content corresponding to, e.g., audio book content and the buttons are configured to enable functionality relevant to interfacing with, e.g., audio book content, the skin 3 is preferably produced to include graphically illustrated buttons, each of which suitably enables facile identification of the function tied to each particular button. However, it is to be appreciated that if the unitary button 34 embodiment of FIGS. 8a and 8b is employed, various graphic indicia may suitably be directly printed and/or molded onto the buttons 34 themselves.

With continued reference to the programmability example embodiment of the player 2, the buttons 34 may suitably include various buttons that are tied to a function that remains constant regardless of the digital content loaded on the player 2, and may suitably also include various buttons that remain variable, the function of which is determined on a content basis. With reference to an example constant function button, the player 2 may suitably include a button that corresponds to a power/play/pause functionality regardless of the content loaded on the player 2. This button may suitable enable powering on and/or off of the player 2 through actuation of the button, even more preferably through actuation of the button for a predetermined period of time (e.g., by depressing the button for a continuous e.g., three seconds, the player 2 is actuated to alternate between a powered and a non-powered state). The player 2 may additionally be configured to automatically power off it remains in a paused state and/or nothing is interfaced with the headphone jack for a predetermined period of time, such as one hundred and eighty seconds. With continued reference to the power/play/pause example button, brief actuation of the button (e.g., generally quickly depressing the button) suitably causes digital content to play and/or to be paused.

With reference to another example constant function button, the player 2 may suitably include a button that corresponds to a reverse function regardless of the content loaded on the player 2. Actuation of this button suitably causes the digital content to reverse a predetermined amount (e.g., five seconds, ten seconds, fifteen seconds, and the like) and/or to play in a reverse direction, but at an accelerated rate for a predetermined period of time and/or as long as the button is depressed. The player 2 may suitably also include an additional constant function button corresponding to a forward function that enables the generally same functionality of the reverse function button, but with reference to a forward directional orientation of the content.

With reference to yet another example constant function button, the player 2 may suitably include a button that corresponds to a reverse chapter and/or track skip function regardless of the content loaded on the player 2. Actuation of this button suitably causes the digital content to reverse a predetermined amount (e.g., thirty seconds, sixty seconds, and the like) and/or to reverse to a location within the digital content (e.g., to a previous chapter stop). The player 2 may suitably also include an additional constant function button corresponding to a forward chapter skip function that enables the generally same functionality as the reverse chapter skip button, but with reference to a forward directional orientation of the content.

As previously mentioned, the player 2 may additionally include variable function buttons, other than the constant function buttons, having functions tied thereto, which functions are determined programmatically at the time of content loading so that the buttons may enable functionality appropriate to the digital content loaded on the player 2. The player 2 may include any appropriate number of variable function buttons, depending on the particular needs and desires for player 2 functionality.

With reference to the variable function buttons, the player 2 may suitably include a button that corresponds to a volume up function. Actuation of this button suitably causes the digital content to be played at a volume generally higher than the volume at which it was being played prior to actuation of the button. The player 2 may suitably also include an additional variable function button corresponding to a volume down function that enables generally the same functionality as the volume up button, but with reference to reducing the relative volume of the player 2. The volume control buttons preferably remain variable so that the location of the buttons may be optimized relative to the other variable function buttons.

With reference to another variable function button, the player 2 may suitably include a button that corresponds to an equalizer function. An equalizer button is preferably provided in connection with digital content generally corresponding to music or similar content. In a preferred embodiment, the player 2 is configured to include a plurality of equalizer settings (e.g., a rock equalizer setting, a jazz equalizer setting, a classical equalizer setting, a special effects equalizer setting (e.g., one that mimics the sound of the music as if being played in a particular venue (e.g., a cathedral, a small concert room, and the like)), and the like), the function and utility of such equalizer settings being known to one of ordinary skill in the art. Actuation of the equalizer button suitably causes the player 2 to cycle the equalizer to the next setting of the plurality of settings and to play the digital content in accordance with the equalizer setting.

With reference to yet another variable function button, the player 2 may suitably include a button that corresponds to a bookmarking function, which function has generally been referenced hereinabove. A bookmarking button is preferably provided in connection with digital content generally corresponding to audio book or similar content. As known, when reading a physical book, a reader thereof typically prefers to physically place an item (e.g., a bookmark) between pages of the book so as to enable ready identification of the last portion read or of other areas that the reader deigns merits further reading and/or attention. Preferably, the player 2 of the present invention incorporates a similar feature as applied to the digital content. Specifically, one of the variable function buttons is preferably tied to a bookmarking feature that enables a user to associate a particular portion of the digital content with a bookmark. Thus, for example, if a user is listening to a portion of the content and desires to enable ready return to that portion, the user depresses the bookmarking button so that that portion of the content is associated with an identifier. When the user desires to return to the bookmarked portion, the user suitably directs the player 2 to identify the bookmarked portion and begin playing from that point. In an embodiment, the bookmarking button may suitably enable both setting of a bookmark and return to a set bookmark. For example, if a user desires to set a bookmark, the user suitably depresses the bookmarking button for a predetermined period of time, such as five seconds. By way of additional example, when the user desires to return to the bookmarked portion, the user suitably quickly depresses the bookmarking button, which depressing causes the player 2 to return to the bookmarked passage. It is to be appreciated that multiple bookmarks may suitably be set and access to the multiple bookmarks may be enabled through any desired method. For example, if multiple bookmarks are set, quick depression of the bookmarking button may suitably display a bookmark. Repeated quick depressions of the same button may suitably seriatim scroll through the available bookmarks. When the desired bookmark is displayed, the user may depress any suitable button, such as the play button, to cause the player 2 to initiate playing from that bookmark. It is also to be appreciated that the foregoing discussion of bookmarking features and functionality is by way of example only and that any suitable and conventional approach may be employed for implementing bookmarking.

With reference to another variable function button, the player 2 may suitably include a button that corresponds to a variable speed voice control function. A variable speed voice control function is most preferably employed in connection with digital content corresponding to audio book, instructional or other general narrative content. Certain users may optimally enjoy and benefit from listening to certain content if the content may be played at either a reduced or accelerated speed. Accordingly, the variable speed voice control function of the present invention suitably enables a user to direct the player 2 to play the content at either a reduced speed or at an accelerated speed. In an embodiment, quick and seriatim depression of the variable speed control button suitably causes the display to alternatively display any of the playback speed options available (e.g., half speed, quarter speed, one and one quarter speed, one and one half speed, double speed, and the like). When the desired playback speed option is displayed, the user selects that option through any suitable means, such as depressing the variable speed voice control button for an extended period of time, depressing the play button, depressing a discrete variable speed voice control select button, or any other suitable button. Thus, through interaction with the variable speed control button, users with reduced aural comprehension abilities may enjoy listening to the content at a reduced speed, while users with enhanced aural comprehension abilities may enjoy listening to the content at an accelerated speed.

Although the invention has been described with regard to certain preferred example embodiments, it is to be understood that the present disclosure has been made by way of example only, and that improvements, changes and modifications in the details of construction and the combination and arrangement of parts may be resorted to without departing from the spirit and scope of the invention. Such improvements, changes and modifications within the skill of the art are intended to be covered by the scope of the appended claims.

What is claimed is:

1. A personal media player comprising:
   a user-inaccessible memory having preloaded digital content stored therein, wherein the digital content is inalterable by a user;
   a microprocessor coupled to the memory;
   a headphone jack coupled to the microprocessor;
   a content loader interface interior to the headphone jack, wherein content to be stored in the memory is loaded into the memory via an insertion of an elongated contact into the headphone jack, making contact with the content loader interface;
   a user interface, coupled to the microprocessor, adapted for receiving user input indicative of a desired manipulation of the digital content; and
   a display adapted for displaying graphic information indicative of a preselected aspect of the digital content.

2. The personal media player of claim 1 further comprising bookmarking means, responsive to user input, adapted for associating a selected portion of the digital content with a bookmark.

3. The personal media player of claim 2 further comprising a bookmark recalling means, responsive to user input, adapted for actuating playback of the digital content from a position of proximity to the bookmark.

4. The personal media player of claim 3 further comprising playback speed control means, responsive to user input, adapted for actuating playback of the digital content at a speed that differs than normal playback speed.

5. The personal media player of claim 4, wherein the playback speed control means is adapted to actuate playback of the digital content at a speed that is slower than normal playback speed.

6. The personal media player of claim 4, wherein the playback speed control means is adapted to actuate playback of the digital content at a speed that is faster than normal playback speed.

7. The personal media player of claim 1 further comprising an equalizer means, responsive to user input, adapted for playing the digital content in accordance with a preselected equalizer mode.

8. The personal media player of claim 7 further comprising an equalizer mode selection means, responsive to user input, adapted for selecting an equalizer mode in accordance with which the equalizer means causes the digital content to be played.

9. The personal media player of claim 1, wherein the display is adapted to display first graphic information, for a predetermined period of time, indicative of a first preselected aspect of the digital content, and second graphic information, for a predetermined period of time, indicative of a second preselected aspect of the digital content.

10. The personal media player of claim 9, wherein the first preselected aspect of the digital content is at least one selected from the group consisting of battery status information, a chapter identification of a portion of digital content being played, an elapsed chapter time indicative of an amount of time that a currently being played chapter has been played, a chapter remaining time indicative of an amount of time that a currently being played chapter remains to play, information indicative of a title of a chapter currently being played, information indicative of an author of the chapter currently being played, information indicative of a current volume level, information indicative of a current equalization mode, information indicative of a playback speed, and information indicative of a bookmark.

11. A personal media player comprising:
   a user-inaccessible memory having preloaded digital content stored therein, wherein the digital content is inalterable by a user;
   a microprocessor coupled to the memory;
   a headphone jack coupled to the microprocessor;
   a content loader interface interior to the headphone jack, wherein content to be stored in the memory is loaded into the memory via an insertion of an elongated contact into the headphone jack, making contact with the content loader interface;

a user interface, coupled to the microprocessor, adapted for receiving user input indicative of a desired manipulation of the digital content;

bookmarking means, responsive to user input, adapted for associating a selected portion of the digital content with a bookmark; and a display adapted for displaying graphic information indicative of a preselected aspect of the digital content.

12. The personal media player of claim 11 further comprising a bookmark recalling means, responsive to user input, adapted for actuating playback of the digital content from a position of proximity to the bookmark.

13. The personal media player of claim 12 further comprising playback speed control means, responsive to user input, adapted for actuating playback of the digital content at a speed that differs than normal playback speed.

14. The personal media player of claim 13, wherein the playback speed control means is adapted to actuate playback of the digital content at a speed that is slower than normal playback speed.

15. The personal media player of claim 13, wherein the playback speed control means is adapted to actuate playback of the digital content at a speed that is faster than normal playback speed.

16. The personal media player of claim 11 further comprising an equalizer means, responsive to user input, adapted for playing the digital content in accordance with a preselected equalizer mode.

17. The personal media player of claim 16 further comprising an equalizer mode selection means, responsive to user input, adapted for selecting an equalizer mode in accordance with which the equalizer means causes the digital content to be played.

18. The personal media player of claim 11, wherein the display is adapted to display first graphic information, for a predetermined period of time, indicative of a first preselected aspect of the digital content, and second graphic information, for a predetermined period of time, indicative of a second preselected aspect of the digital content.

19. The personal media player of claim 18, wherein the first preselected aspect of the digital content is at least one selected from the group consisting of battery status information, a chapter identification of a portion of digital content being played, an elapsed chapter time indicative of an amount of time that a currently being played chapter has been played, a chapter remaining time indicative of an amount of time that a currently being played chapter remains to play, information indicative of a title of a chapter currently being played, information indicative of an author of the chapter currently being played, information indicative of a current volume level, information indicative of a current equalization mode, information indicative of a playback speed, and information indicative of a bookmark.

20. A personal media player comprising:
a user-inaccessible memory having preloaded digital content stored therein, wherein the digital content is inalterable by a user;
a microprocessor coupled to the memory;
a headphone jack coupled to the microprocessor;
a content loader interface interior to the headphone jack, wherein content to be stored in the memory is loaded into the memory via an insertion of an elongated contact into the headphone jack, making contact with the content loader interface;
a user interface, coupled to the microprocessor, adapted for receiving user input indicative of a desired manipulation of the digital content;
playback speed control means, responsive to user input, adapted for actuating playback of the digital content at a speed that differs than normal playback speed; and
a display adapted for displaying graphic information indicative of a preselected aspect of the digital content.

21. The personal media player of claim 20, wherein the playback speed control means is adapted to actuate playback of the digital content at a speed that is slower than normal playback speed.

22. The personal media player of claim 20, wherein the playback speed control means is adapted to actuate playback of the digital content at a speed that is faster than normal playback speed.

23. The personal media player of claim 20, wherein the playback speed control means is adapted to actuate playback of the digital content at a speed that is faster than normal playback speed and at a speed that is slower than normal playback speed.

24. The personal media player of claim 20 further comprising bookmarking means, responsive to user input, adapted for associating a selected portion of the digital content with a bookmark.

25. The personal media player of claim 24 further comprising a bookmark recalling means, responsive to user input, adapted for actuating playback of the digital content from a position of proximity to the bookmark.

26. The personal media player of claim 20 further comprising an equalizer means, responsive to user input, adapted for playing the digital content in accordance with a preselected equalizer mode.

27. The personal media player of claim 26 further comprising an equalizer mode selection means, responsive to user input, adapted for selecting an equalizer mode in accordance with which the equalizer means causes the digital content to be played.

28. The personal media player of claim 20, wherein the display is adapted to display first graphic information, for a predetermined period of time, indicative of a first preselected aspect of the digital content, and second graphic information, for a predetermined period of time, indicative of a second preselected aspect of the digital content.

29. The personal media player of claim 28, wherein the first preselected aspect of the digital content is at least one selected from the group consisting of battery status information, a chapter identification of a portion of digital content being played, an elapsed chapter time indicative of an amount of time that a currently being played chapter has been played, a chapter remaining time indicative of an amount of time that a currently being played chapter remains to play, information indicative of a title of a chapter currently being played, information indicative of an author of the chapter currently being played, information indicative of a current volume level, information indicative of a current equalization mode, information indicative of a playback speed, and information indicative of a bookmark.

* * * * *